(No Model.)
F. J. BRAUCH.
PUTTY KNIFE.
No. 508,273. Patented Nov. 7, 1893.
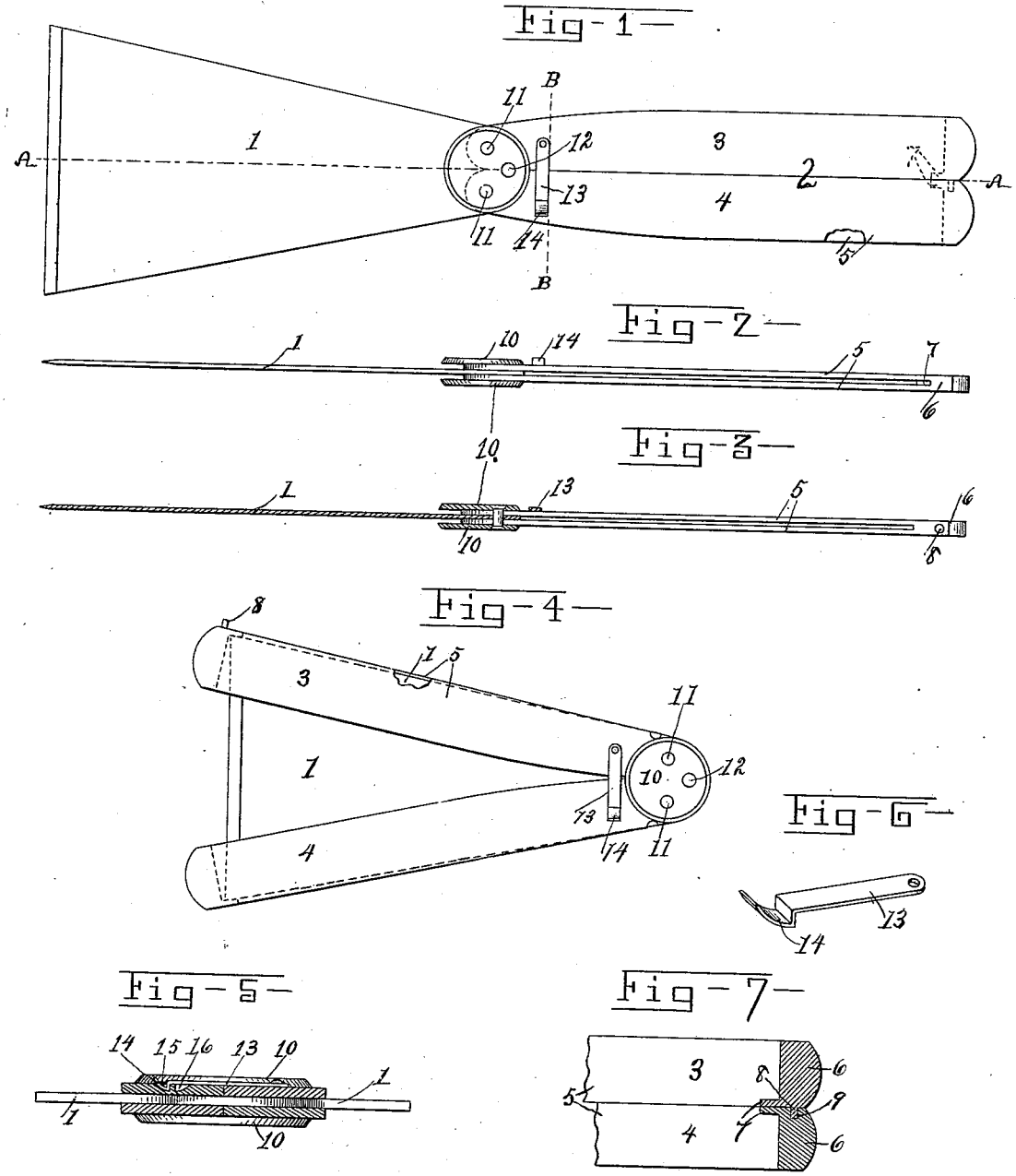

UNITED STATES PATENT OFFICE.

FREDRICK J. BRAUCH, OF ST. LOUIS, MISSOURI.

PUTTY-KNIFE.

SPECIFICATION forming part of Letters Patent No. 508,273, dated November 7, 1893.

Application filed March 27, 1893. Serial No. 467,901. (No model.)

*To all whom it may concern:*

Be it known that I, FREDRICK J. BRAUCH, of the city of St. Louis and State of Missouri, have invented certain new and useful Improvements in Putty-Knives, of which the following is a full, clear, and exact description, reference being had to the accompanying drawings, forming a part hereof.

My invention relates to the class of devices known as putty-knives, and consists in the novel construction, combination and arrangement of parts hereinafter described and designated in the claims.

The object of my invention is to provide an improved putty knife having the usual wide blade, and a handle divided in a plane at right angles to the flat faces of said blade so as to form two independent sections having adjacent ends pivoted to the shank of said blade by separate pivots, so that each of said sections will lie in the same plane, and may be swung around separately in opposite directions but in the same plane to either bare the said blade, or to provide a protection against the angular corners of the free end of said blade.

In the drawings: Figure 1 is a top plan view of my complete invention. Fig. 2 is a side elevation of the same. Fig. 3 is a longitudinal sectional view taken on the line A—A in Fig. 1. Fig. 4 is a detail plan view showing the divided handle providing protection for the corners of the blade. Fig. 5 is a detail enlarged transverse sectional view taken through the line B—B in Fig. 1. Fig. 6 is a detail perspective view of a spring-catch made use of in carrying out my invention. Fig. 7 is an enlarged detail sectional view showing the connection between the two handle-sections when clasped to form a handle.

1 indicates the blade. The handle 2 is divided in a plane at right angles to the flat surface of the blade, and is composed of two separate sections 3 and 4, each having two parallel plates or scales 5 pivotally mounted at adjacent ends on opposite sides of the shank of the blade 1, and the opposite adjacent ends being provided with a spacing-block 6, which spaces said ends of each section a distance apart. This construction permits the sections of the handle to have an independent swinging movement in a plane with each other, and in a plane at right angles to the plane upon which the handle is divided, so that each of said sections may be swung around over the blade to form a complete protecting handle for each of its edges, or may be swung around in an opposite direction to form a complete handle when the device is to be used as a putty-knife. When the sections are closed upon the blade, said blade occupies a position in the space between each of the scales 5. The spacing-blocks 6 of each section are provided with projections 7 which project substantially parallel, with their free ends toward the pivots of said sections, and when the said sections are in the position shown in Fig. 4, these projections are engaged by the sharp corners of the blade and act as an effective protection therefor. When said sections of the handle are in the position shown in Fig. 1, said projections 7 lie closely adjacent. When the handle sections are in the position shown in Fig. 4, the projections 7 prevent the passage of the sharp corners of the blade beyond the outer edge of said handle sections, so that if the knife be carried in the pocket all danger of puncturing said pocket is thereby avoided, said projections acting as a guard to protect the corners of the blade. One of the sections (in this case the section 3) is provided with a pin or lug 8 in one edge of its spacing-block 6, which projects at a right-angle to the edge of said section and loosely engages in a corresponding socket or depression 9 in the other section of the handle, and holds the free ends of said sections in the same plane when the knife is open. Each section of the handle is connected to the shank of the blade by a separate rivet or pintle, which is passed through said shank at separate points adjacent to the edges thereof.

A plate 10 overlaps the adjacent ends of each handle section on one side thereof, and a similar plate is oppositely mounted upon the opposite sides of said sections and overlaps the same, and three rivets or pintles 11 are placed through suitable holes in the superposed parts, and located in the following relations: The separate rivet or pintle 11, as previously stated, is passed through each of the sections 3 and 4 and the blade 1 at points adjacent the opposite edges of the shank of said blade, and a third rivet or pintle 12 is passed through the plates 10 and the shank of the blade so as to clear the handle sections at a point intermediate of the two rivets adjacent the edges of said shank, and at a point near the inner end of said shank, and opposite recesses upon the inner edges of the sections 3 and 4 engage on opposite sides of said third rivet or pintle so as to permit the said sections to be closed upon each other when the device is to perform the functions of a putty knife. In such case the said third rivet or pintle will then lie in the said opposite recesses and prevent the blade from moving laterally in either direction.

Pivotally secured at one end upon the outer surface of the section 3, at a point adjacent the free end of said section, is a flat steel spring 13 having a V-shaped projection 14 adjacent its free end, and which projection is adapted to engage in a notch or depression 15 formed in the outer surface of the section 4 when said sections are in position for use. When the said sections are closed over the blade 1, the spring 13 is swung around so that its free end will project over the opposite edge of the section 3, and engage a notch or depression 16 formed in said section 4 closely adjacent the notch or depression 15. The sections of the handle may be thus locked together when occupying either a closed or open position. The said V-shaped projection upon said spring may be readily lifted clear of said depressions when it is desired to separate the handle sections.

It will be observed that the free ends of the handle sections 3 and 4 rest in contact when they are grasped by the operator in using the device as a putty knife, and are securely locked in such position; but it will be further observed that said ends of said sections are separated a distance when said sections are folded upon the blade, and they are thus spaced apart by the blade itself, said blade having a sufficient width at its free end to limit the movement of said ends toward each other, and hold them out of contact. This I believe is an important point in the construction and function of a knife of this class.

It will be further seen that I have provided improved means for locking the handle sections together in both positions, and for holding them accurately in the same plane.

I am well aware of the patent granted to me May 31, 1887, No. 364,159, for a putty knife, and I am further aware that pocket knives and putty knives have been heretofore constructed with a hollow handle and a blade pivoted thereto so as to be swung around within the handle, or clear of the same, and provided with means for holding said blade in either position.

I am further aware that a painter's implement, consisting of a putty-knife blade pivotally connected to separate members of the handle, has heretofore been provided, and I do not claim such as my invention, as it would not answer my purpose, for the reason that said members of the handle are not mounted to swing in the same plane but are pivoted on opposite flat sides of said blade to swing in different planes; but I am not aware that a putty knife, such as I have herein described and shown, has ever been constructed.

A blade of an ordinary pocket knife has not sufficient width to act as a stop to limit the movement of the handle sections toward each other in the manner shown and described by me.

What I claim is—

1. The improved putty knife, having a wide blade 1, a handle 2 divided in a plane at right angles to the flat faces of said blade and forming two separate sections, the adjacent ends of which are pivoted to the shank of said blade by separate pintles, so that each of said sections will lie in the same plane and may be swung around separately in opposite directions in the same plane to either bare the said blade or to provide a protection for the angular corners of the free end thereof, spacing-blocks 6 located adjacent the free ends of each section and provided with projections 7 which extend substantially parallel with their free ends toward the pivots of said sections when said sections are swung around to form the handle, said projections 7 engaging opposite edges of said blade when said sections are swung in the reverse direction, and holding the free ends of said sections a distance apart when in the last named position, and a rivet or pintle 11 fixed in the shank of said blade so as to be engaged by each of said sections to hold said blade rigidly in position when the knife is open, substantially as herein specified.

2. The improved putty knife, having a wide blade 1, a handle 2 divided in a plane at right angles to the flat faces of said blade and forming two separate sections 3 and 4, the adjacent ends of which are pivoted to the shank of said blade by separate pintles 11, so that each of said sections will lie in the same plane and may be swung around separately in opposite directions in the same plane to either bare the said blade or provide a protection for the angular corners of the free end thereof, said separate pintles being passed through the shank of said blade at separate points one adjacent each edge thereof, a plate 10 overlapping the adjacent ends of each handle section on one side thereof, a similar plate oppositely mounted upon the opposite side of said sections and overlapping the same, a third rivet or pintle 12 passed through the the plates 10 and the shank of the blade so as to clear the handle sections at a point intermediate of the two pintles which are located adjacent the edges of said shank, said sections having opposite recesses formed in their inner edges, said recesses being engaged by said third pintle to permit said sections to be closed upon each other when the device is to perform the functions of a putty knife, said third pintle then engaging said opposite recesses and preventing the blade from moving laterally in either direction, spacing-blocks 6 carried by the free ends of said sections and having projections 7 which contact with the opposite edges of said blade when said sections are swung around and close upon the blade, said projections being arranged to hold the free ends of said sections a distance apart when in this last named position, and a pin or lug 8 mounted upon one edge of one of said sections and projecting at an angle therefrom, and loosely engaging a notch or depression 9 in the other section to hold the free ends of said sections in the same plane when the knife is open, substantially as herein specified.

In testimony whereof I affix my signature in presence of two witnesses.

FREDRICK J. BRAUCH.

Witnesses:
C. K. JONES,
JNO. C. HIGDON.